TAPE TRANSPORTING APPARATUS

Filed May 4, 1964

2 Sheets-Sheet 1

INVENTORS
WEAVER T. BRIAN, JR.
GARY R. WOOD
CARL R. TARVER
BY
A. Warren
ATTORNEY

TAPE TRANSPORTING APPARATUS

Filed May 4, 1964 2 Sheets-Sheet 2

INVENTORS
WEAVER T. BRIAN, JR
GARY R. WOOD
CARL R. TARVER
BY
A. Wasserman
ATTORNEY United States Patent Office 3,269,670
Patented August 30, 1966

3,269,670
TAPE TRANSPORTING APPARATUS

Weaver T. Brian, Jr., Thousand Oaks, and Gary R. Wood and Carl R. Tarver, Canoga Park, Los Angeles, Calif., assignors, by mesne assignments, to The Bunker-Ramo Corporation, Stamford, Conn., a corporation of Delaware Filed May 4, 1964, Ser. No. 364,643
14 Claims. (Cl. 242—55.12)

The present invention relates to a web material transport system and, more particularly, to an improved apparatus, operable in conjunction with a tape utilizing device, for supplying and taking up tape.

The average person is familiar with home-type tape recorders used for recording on tape and playing back from the tape sounds such as music or speech. Generally, a tape recorder includes a part known as a magnetic head which is capable of transcribing signals to a tape which is coated with a material having magnetic properties. Such a magnetic head may also operate to detect or "read" signals transcribed on the tape and supply such signals to electronic circuitry in order to play back the signals and convert them into audible sounds. The tape passing by the magnetic head is generally moved by a capstan which rotates at a constant speed and against which the tape is pressed by an idler or pinch roller. The tape advanced by the capstan is supplied from a supply reel, and after the signals are transcribed thereon or read therefrom, the tape is wound on a take up reel.

The use of tape as a medium on which signals may be transcribed, or from which signals may be read, is not limited to home-type tape recorders. Rather, it is used most extensively in industry and especially in conjunction with computers which are capable of receiving and providing signals at high speeds. In such applications the tape is generally transported by a device which operates at speeds compatible with those of the rest of the computing circuitry. The tape may be a magnetic tape, which is basically a plastic-based tape coated with a material having magnetic properties, or it may be of the punched-tape variety, namely, one in which signals are transcribed by punching holes therein and signals read therefrom by sensing and decoding the combinations of punched holes.

Regardless, however, of what type of tape is used, and whether signals are being transcribed onto or read from it, the primary requirement of apparatus which supplies the tape and takes it up is that it operates without affecting the speed at which the tape is transported. Furthermore, such apparaus should operate to prevent the tape from becoming intertwined and/or torn. These requirements become more critical whenever the tape is transported at relatively high speeds, since under such circumstances the supply reel and take-up reel must supply and take up tape at high speeds, and at the same time cause enough tape to be looped between them so that the tape may be moved by the capstan without any substantial forces being exerted on it by the turning reels. In addition, apparatus for handling the supply and take up of tape must be capable of rewinding the tape, that is, the supply and take-up reels must be capable of functioning interchangeably. It is generally desired to rewind tape in short time periods, i.e., at high speed, because during such periods signals are generally neither transcribed on nor read from the tape. It seems clear therefore that such an apparatus must be designed to cause the tape to be moved in either of two opposite directions without being subjected to excessive tensile forces which might rupture or tear it. Furthermore, since quite often it is desirable to change, in a short period of time, the direction in which the tape is moving, namely, change the mode of operation of the apparatus from a forward or normal mode to a rewind or reverse mode and vice versa, it is apparent that the operation of the apparatus and especially the manner in which the take-up and supply reels rotate is most important to insure proper performance without damage or wear on the tape. Although presently known devices operate with varying degrees of satisfaction, they do not generally fulfill the rigid requirements that high speed tape supplying and take-up devices dictate.

The present invention, which provides an improved apparatus for supplying and taking up tape, is based on novel circuitry whereby the operation of the supply and take-up reels is made a function of the length of tape between them, thereby insuring a satisfactory supply of tape for a transcribing or reading device. In addition, the invention provides a novel arrangement which enables the apparatus to be switched from one mode of operation to another in a very short time period, and provides for variable speed tape rewinding, which prevents damage or ill effects on the tape. The improved apparatus of the invention disclosed herein possesses other advantageous features not found in other known supply and take-up tape devices. For simplicity of terminology, the apparatus disclosed herein will hereinafter be referred to as a tape reeler.

Basically, the tape reeler of the present invention comprises a supply reel from which tape is fed in the forward mode of operation and taken up by a take-up reel. In the forward mode of operation, rotation of the reels is controlled as a function of the length of tape between each of them and an intermediate capstan of a tape utilizing device which drives the tape. Whenever the length of tape between the capstan and the take-up reel is less than a predetermined value, the motor which causes the reel to rotate and thereby take up tape is deenergized. Stopping the motor stops the take-up reel from rotating and taking up any more tape until the tape advanced by the capstan increases the length of tape between the capstan and take-up reel, so that the take-up motor is reenergized to cause the reel to again take up the tape. Similarly, the motor which causes the rotation of the supply reel, hereinafter referred to as the supply motor, is controlled as a function of the length of tape between the supply reel and the capstan. Whenever the length of tape between them increases above a predetermined length, indicating that the supply reel is supplying tape faster than it is being advanced by the capstan, the supply motor is deenergized, preventing the supplying of additional tape until the capstan has advanced sufficient tape to reduce the length of tape between it and the supply reel. At such time, the supply motor is reenergized to start supplying additional tape to the capstan. In addition, the present invention incorporates means which deactivate the entire system whenever the supply and take-up reels do not supply or take up sufficient tape, respectively, for safe operation, thereby indicating that either or both motors are operating unsatisfactorily.

The apparatus of the present invention also incorporates circuitry which permits changing the mode of operation of the apparatus in an extremely short time without damaging the tape. The circuitry includes a braking arrangement which is energized whenever the apparatus is switched from one mode of operation to the other, and causes both the take-up and supply motors to stop or brake substantially instantaneously and remain stopped for a preselected time period, controlled by a time dependent or varying circuit. Thereafter, the brakes on the two motors are released permitting the motors to turn in a direction opposite to that in which they previously turned so that the tape is supplied from the reel on which it was previously taken up. For example, in the forward mode of operation, the supply reel supplies tape to the capstan which advances it at a constant speed, the tape being taken up by the take-up reel. However, in the rewind mode of operation, the supply reel takes up the tape supplied to it by the take-up reel. Since in the rewind mode the capstan is usually disengaged from the tape, because in this mode the speed with which the tape is moved is not critical from a signal transcribing or reading point of view, the speed of rewinding is usually controlled by the motor which turns the reel on which the tape is rewound. As previously stated, in most applications it is desirable to rewind tape in as short a time as possible, which means that the supply reel (which now acts as a take-up reel) should rotate at relatively high speed. However, it has been found that whenever the tape reeler operation is changed from a forward to a rewind mode, most of the tape between the two reels should first be taken up at a relatively slow speed, and only then should the rewinding speed be increased. This is in order to prevent the tape from being subjected to sudden tensile forces which often cause the tape to be torn or damaged.

The change in speed during rewinding, as well as control of the rotation of the take-up and supply motors in the forward mode, are accomplished by means of a plurality of switches, such as micro-switches, which are opened or closed by a pair of spring biased arms about which the tape is wound. The arms, hereinafter referred to as the take-up arm and the supply arm, are generally pulled by their biasing springs toward rest or relaxed positions. However, when tape is wound about them and exerts forces on them, their positions with respect to their rest positions become functions of the length of tape between their respective reels and the capstan. For example, the position of the supply arm, which is so arranged that tape from the supply reel being advanced by the capstan is wound about it, will depend on the length of tape between capstan and supply reel; the longer the length of tape, the closer will the supply arm be to its rest position. As the length of tape shortens, the arm tends to move away from its rest position. A plurality of switches are positioned in the path of the arm's movement, these switches being activated as the arm passes by them, thereby controlling the operation of a portion of the reeler. Similarly, the movement of the take-up arm, which is positioned between the capstan and the take-up reel, is a function of the length of tape between the latter mentioned elements, its movement controlling the operation of a plurality of switches which in turn control some other steps in the operation of the reeler.

In normal operation, the switches controlled by the movable arms are subjected to repeated signal switching, resulting in a considerable wear of their contacts. This is particularly the case when micro-switches having small contacts are used. To prolong the life of the switches and thereby increase the uninterrupted use of the improved reeler, the apparatus disclosed herein includes means for suppressing arcing across the contacts, thereby greatly reducing the erosion of or the damage to them.

The novel features which are believed to be characteristic of the invention, together with other advantages thereof, will be better understood from the following description taken in conjunction with the accompanying drawings in which.

Figure 1:
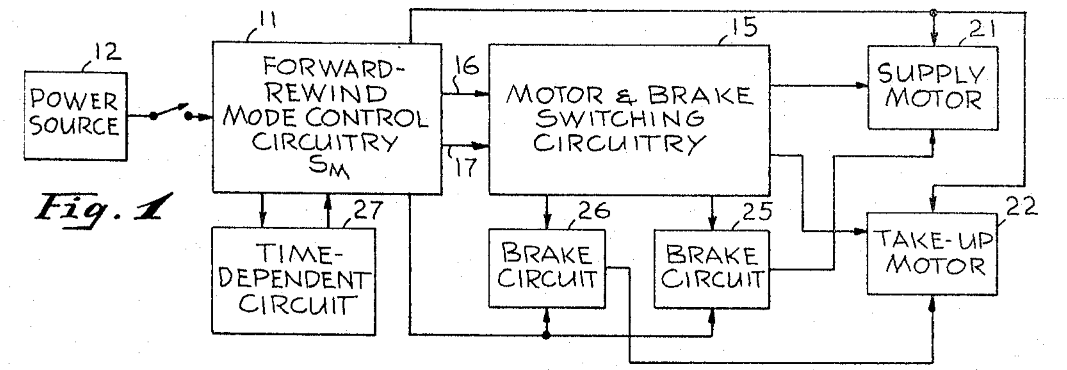
FIGURE 1 is a block diagram of the improved apparatus of the invention.

Reference is now made to FIG. 1 wherein the improved apparatus of the present invention is shown in block diagram form. As seen therein, the apparatus comprises forward and rewinding mode control circuitry 11, hereinafter also referred to as the mode control circuitry 11, energized by a power source 12 through a power switch $S_p$. Output power from the mode control circuitry 11 is supplied to motor and brake switching circuitry 15, hereinafter also referred to as the switching circuitry 15, by means of either one of the lines designated by numerals 16 or 17, depending on whether the apparatus is operating in the forward or rewind mode, respectively. Output power from the switching circuitry 15 is provided to a supply motor 21 and a take-up motor 22, which are also connected to the forward and rewind mode control circuitry 11 so that the power supplied to these motors causes them to rotate in either the forward or rewind directions, as determined by the forward and rewind mode control circuitry 11. In addition, the apparatus includes brake circuits 25 and 26 which are, respectively, connected to the supply motor 21 and the take-up motor 22 for stopping either or both of them as a function of signals supplied to the circuits 25 and 26 from the motor and brake switching circuitry 15 to which they are connected. A time dependent circuit 27 is energized by signals from the forward and rewind mode control circuitry 11 whenever the apparatus is operating in either the forward or rewind modes. As soon as the mode of operation of the apparatus of the direction or rotation of the motors 21 and and 22 is reversed by means of the forward and rewind mode control circuitry 11, the time dependent circuit 27 produces signals which pass through the control circuitry 11 and therefrom to the brake circuits 25 and 26 in order to temporarily stop the supply motor 21 and the take-up motor 22 for a predetermined time period.

Figure 2:
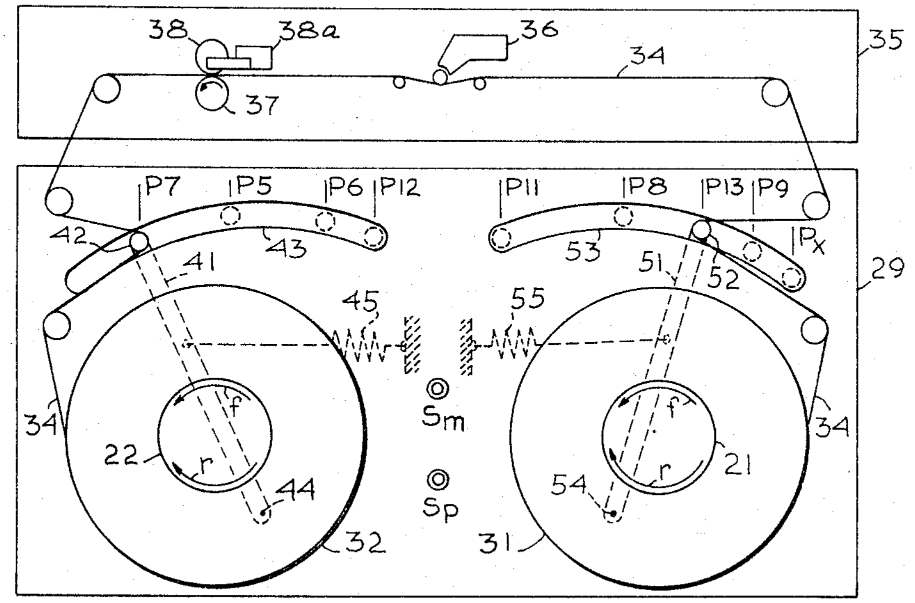
FIGURE 2 is a front elevational view of a front panel of the apparatus of the invention.

For a better understanding of the present invention, reference is now made to FIG. 2 wherein a front panel 29 of the apparatus of the invention is shown. As seen therein, the power switch $S_p$ which controls the supply of power from the power source 12 to the forward and rewind mode control circuitry 11, is exposed on the front panel. A switch $S_m$ is also exposed on the front side of the panel and is used to select the mode of operation of the apparatus once the power switch is closed. The supply motor 21 and take-up motor 22, previously referred to in connection with FIG. 1, are also mounted on but behind the front panel. However, their armature shafts protrude through the front panel so that a supply reel 31 spectively, so that each reel rotates whenever the armature shafts of the supply motor 21 and take-up motor 22, respectively, so the each reel rotates whenever the armature of its respective motor rotates. A tape 34 to be supplied to a tape utilizing device, such as that shown in FIG. 2 and designated generally by numeral 35, is wound on the supply reel 31. For explanatory purposes only, the tape utilizing device 35 is shown as comprising a transcribing or reading head assembly 36 and a capstan 37 against which a pinch roller or idler 38 is pressed by a solenoid 38*a*. It is apparent to one familiar in the art that the capstan, which is caused to rotate at a selected speed, will pull in the direction of its rotation any tape which may be present between its outer surface and that of the pinch roller when the solenoid 38*a* is energized. The tape 34 wound on the supply reel 31 is passed by the transcribing or reading assembly 36 and threaded between the capstan 37 and its associated pinch roller 38. The tape passing between the capstan 37 and pinch roller 38 is then fed to the take-up reel 32 which is mounted on the armature of the take-up motor 22. Assume that the apparatus of the invention, as shown in FIG. 2, is operating in the forward mode, with the supply and take-up reels rotating counterclockwise as indicated by the arrows designated *f* and the capstan 37 of the tape utilizing device 35 similarly rotating in a counterclockwise direction. It is apparent then that the tape previously wound on the supply reel 31 will be pulled by the capstan 37 and the pinch roller 38 as a result of the friction therebetween, and will be gradually wound on the take-up reel 32. Although such an arrangement is typical in home-type tape recorders and other instruments utilizing tapes which operate at relatively low speed, additional circuitry and arrangements are necessary to insure proper operation whenever such an apparatus is to operate at high speeds which are compatible with the high speeds which computers and other industrial type systems operate. To this end, the improved apparatus of the present invention further includes a pivotally mounted arm 41 having a roller 42 mounted thereon and protruding through the front panel 29 through an opening 43. The arm may be pivotally mounted behind the front panel to pivot about a point 44. The arm 41 is generally biased, such as by a spring 45, so that it tends to occupy a rest or relaxed position indicated at P12. The roller 42, which protrudes through the front panel, is adapted to have tape wound about it with a minimal friction being exerted on the tape by the roller.

From FIG. 2 it is apparent that as long as the pinch roller 38 and the capstan 37 advance tape at a rate which is not less than that at which tape is being taken up by the take-up reel 32, the arm 41 will not tend to be pulled away from its rest or relaxed position; however, as soon as the take-up reel 32 takes up tape faster than it is supplied through the capstan 37 and idler 38 arrangement, the tensile forces in the tape acting on the roller 42 will tend to swing the arm 41 away from its rest point, indicated by P12, in a counterclockwise direction about its pivotal point 44. For example, as shown in FIG. 2, under some circumstances the roller 42 may occupy any one of a plurality of positions in the opening 43. As the roller 42 passes any one of a specific number of points, such as those designated by P5, P6 and P7, the arm will cause any one of several of a plurality of switches (not shown in FIG. 2) to open or close and thereby control the rotation or the stopping of the take-up motor 22, which, of course, causes the reel 32 to rotate or stop.

The apparatus of the invention comprises another arm 51, which is mounted to pivot about a point 54, the arm having a roller 52 mounted thereon and protruding through the front panel through an opening 53. The roller 52 protruding through the opening 53 is adapted to have tape wound about it. The arm 51, which is biased in a counterclockwise direction by a spring 55, operates in a manner similar to that of the arm 41 previously described. Whenever the roller 52 is pulled away from its rest point designated by P11, and occupies any of a plurality of points, such as P8, P9 and P13, any one or several switches are actuated by the arm 51 to control the rotation or braking of the supply motor 21. This, in turn, affects the rate at which tape is supplied from the reel 31 to the capstan 37 and pinch roller 38 of the tape utilizing device 35.

Assume that tape is being unwound from the reel 31 in the forward mode of operation, is supplied to the tape utilizing device 35, is pulled through by the pinch roller 38 and capstan 37 and is taken up by the take-up reel 32. Further assume that the supply reel 31 is supplying tape faster than the capstan 37 is able to advance it. It is apparent then that the arm 51 about which the tape is wound will be pulled towards its rest point P11, that is, it will tend to swing in a counter-clockwise direction about its pivot point 54. As soon as the arm 51 passes point P8, moving in a direction towards its relaxed or rest point P11, the switch mounted at position P8 is actuated, causing the supply motor 21 to brake or stop, which in turn stops the reel 31 from turning and continuing to supply tape to the tape utilizing device 35. The reel 31 will remain stopped until the capstan 37 has advanced sufficient tape to cause the arm 51 to be pulled in a clockwise direction and pass position P8, at which time the supply motor will no longer be braked or stopped. As the supply motor 21 starts turning again in a counter-clockwise direction, the supply reel 31 mounted thereon will similarly turn in a counter-clockwise direction, again supplying tape to the capstan 37 and pinch roller 38 of the tape utilizing device 35. Similarly, the position of the arm 41 controls the rotation or braking of the take-up motor 22 and the take-up reel 32 as a function of the length of tape between the capstan 37 and the take-up reel 32. Whenever the length of tape increases beyond a predetermined point, the arm 41 will tend to swing towards its relaxed or rest point P12, thereby causing one of the switches which are mounted at positions P5, P6 and P7 to be actuated, and affect the rotation of the take-up motor 22 and the take-up reel 32 coupled thereon. For example, in one embodiment of the present invention, when the apparatus is operating in the forward mode of operation and when the arm 41 is left of the position indicated by P5, a switch positioned thereat causes the take-up motor 22 to temporarily stop, thereby temporarily preventing the take-up reel 32 from taking up any additional tape. But as soon as additional tape is supplied from the capstan 37 and pinch roller 38, the length of tape between the capstan 37 and the reel 32 increases, thereby causing the biased arm 41 to swing toward its rest point P12. As the arm passes by position P5 in a clockwise direction, it releases or unbrakes the motor 22. As the take-up motor 22 starts rotating again the reel 32 mounted thereon starts rotating and taking up the additional tape supplied from the capstan and pinch roller. Such an arrangement for controlling the manner in which tape is supplied and taken up is found to be most satisfactory in high speed operations, since the rotation of the supply and take-up motors is made a function of the speed or the rate with which tape is advanced by the capstan 37, thereby preventing the lengths of tape between the supply reel 31 or the take-up reel 32 and the capstan from increasing or decreasing below predetermined limits. This prevents the tape from being subjected to extreme tensile stresses which may cause the tape to tear, and it also prevents the length of tape from increasing beyond safe limits, thereby preventing the tape from becoming tangled and damaged.

Figure 3:
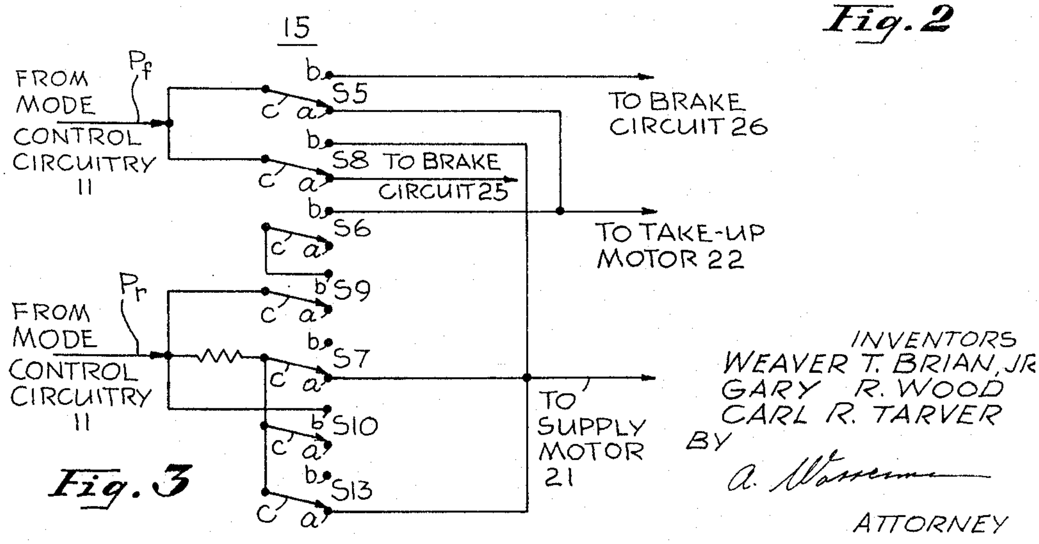
FIGURE 3 is a schematic diagram of circuitry shown in FIG. 1 in block form.

For a better understanding of the invention, and in particular, the switching circuitry 15 which controls the rotation of the supply and take-up motors, reference is made to FIG. 3 wherein the switching circuitry 15 comprising switches S5–S10 and S13 is shown. Each of the switches has a pair of contacts *a* and *b* and a movable contact arm *c* which makes contact with either of its associated contacts *a* or *b*. The switches S5–S9 and S13 are mounted behind the front panel 29 (see FIG. 2) in positions P5–P9 and P13, respectively. In FIG. 3, all the switches are shown with their movable contact arms *c* making contact with their respective contact *a*. This arrangement exists whenever the arm 41 is to the right of position P6, and arm 51 is to the left of position P8 (see FIG. 2). However, as soon as the arm 41 moves to the left of position P6 due to tape pulling on the roller 42, the movable arm *c* of switch S6 mounted at position P6 makes contact with its associated contact *b*, breaking connection with contact *a*. The switch S6 will remain in this state (contacts *b* and *c* being connected) as long as the arm 41 is to the left of position P6. Similarly switches S5 and S7 will have their respective arms *c* make contact with their respective contacts *b* when the arm 41 passes to the left of positions P5 and P7, respectively. As soon as the arm 41 passes to the right of any of the positions P5, P6 or P7, the respective switches S5, S6 or S7 will return to the contacting state shown in FIG. 3. The arm 51 (FIG. 2) in a similar manner actuates switches S8, S9, S13 and S10, switches S8 and S13 are respectively located at positions P8 and P13, and switches S9 and S10 are both located at position P9. As long as the arm 51 is to the left of the switches S8–S10 and S13, their contact state is as shown in FIG. 3. However, as soon as the arm 51 passes to the right of any of those switches, their respective movable arms *c* make contact with the contacts *b*, rather than contacts *a* as shown in FIG. 3. The movable arms *c* of the switches S5 and S8 are connected to the mode control circuitry 11 by means of a line P*f* through which the mode control circuitry 11 supplies the switches with power when the apparatus is operated in the forward mode of operation. The contact *b* of switch S5 is connected to the brake circuit 26 which, as shown in FIG. 1, is used to brake or stop the take-up motor 22, to which contacts *a* and *b* of switches S5 and S6, respectively, are connected. Contact *a* of the switch S8 is connected to the brake circuit 25, which is used to brake the supply motor 21 to which are connected contacts *a*, *b* and *a* of S7, S8 and S13, respectively. The contacts *c* of switches S7, S10 and S13 are connected to one end of a resistor R, whose other end is connected to contact *b* of switch S10, contact *c* of switch S9 and to the mode control circuitry 11 by a line P*r* through which the mode control circuitry supplies power when the apparatus is operated in the rewind mode. In addition, contact *b* of switch S9 is connected to contact *c* of switch S6.

In the forward mode of operation, power is supplied from the mode control circuitry 11 to switches S5 and S8 of the switching circuitry 15 shown in FIG. 3. However, whether the power supplied to switch S5 is in turn supplied to the brake circuit 26 or the take-up motor 22 depends on the state of switch S5. As long as the arm 41 (FIG. 2) is to the right of position P5, switch S5 will supply power to the take-up motor 22 as shown in FIG. 3 so that tape is taken up on the take-up reel 32. However, if the reel 32 takes up tape faster than it is advanced by the capstan 37, the length of tape between the reel 32 and the capstan 37 will decrease, until such time as the arm 41 is pulled by the shortening tape to the left of position P5. At such time switch S5 will change its state so that the power to the take-up motor 22 is interrupted and is instead supplied through contacts *c* and *b* of switch S5 to the brake circuit 26 to stop the take-up motor 22. The take-up motor will remain in a braked or stopped state until sufficient tape has been advanced by the capstan to increase the length of tape and thereby reduce the pulley forces exerted on the arm 41, which then tends to return to its relaxed position P12. As soon as the arm 41 passes to the right of position P5, switch S5 is switched to the state shown in FIG. 3, so that the power from the mode control circuitry 11 is again supplied to the take-up motor 22. From the foregoing description, it is clear that when the apparatus operates in the forward mode, the take-up reel 32 driven by the motor 22 will take up tape as long as the arm 41 is to the right of position P5. However, as soon as the forces exerted by the tape on the arm 41 cause the arm to be pulled to the left of position P5, the power to the take-up motor is interrupted and is instead supplied to the brake circuit 26 which stops the take-up motor from coasting without power.

The rotation of the supply motor 21 in the forward mode of operation is controlled in a similar manner by means of the arm 51 and the switch S8. As long as the arm 52 is pulled to the right of position P8 (see FIG. 2), the switch S8 will be in a state opposite to that shown in FIG. 3 so that power is supplied to the supply motor 21. However, as soon as the arm is to the left of position P8, which, as seen in FIG. 2, happens whenever the supply reel 31 on the supply motor 21 supplies tape faster than the capstan 37 is capable of advancing it, switch S8 will be in a state as shown in FIG. 3; namely, power will no longer be supplied to the supply motor 21 but rather to the brake circuit 25 which stops motor 21 from turning. In high speed operation, the switches S5 and S8 may change from one state to another many times in order to insure that the lengths of tape between capstan and take-up reel and capstan and supply reel are within the desired limits. These limits insure that the motors 21 and 22 do not affect the rate at which the capstan 37 advances the tape, and that the loops of tape do not become excessive in length so that the tape may become tangled and damaged.

In a preferred embodiment of the invention, the brake circuits 25 and 26 comprise magnetic type brakes which respond quickly to rapidly repeated power signals and do not exert excessive drag on the motors when deenergized.

The manner in which the switching circuitry 15 controls the operation of the improved apparatus in the rewind mode of operation may best be explained in conjunction with the switches S6, S7, S9, S10 and S13 shown in FIG. 3. In the rewind mode of operation, the direction of rotation of the motors (supply and take-up) is as indicated by the arrows *r* of FIG. 2. As is quite customary in the rewind mode of operation, the capstan and pinch roller of a tape utilizing device are generally released from the tape and the supply reel 31 now acts as a take-up reel, taking up the tape that was previously wound on the take-up reel 32, which now serves as a supply reel. As previously explained, whenever the apparatus operates in the rewind mode, as controlled by the mode control circuitry 11, power is supplied to the switching circuitry 15 through the line designated P*r*. The power line P*r* is connected to the movable contact arm *c* of switch S9 which is so interconnetced with switch S6 and the take-up motor 22 that power is supplied to the take-up motor 22 only when both switches S6 and S9 have their movable contact arms *c* in contact with their respective contacts *b*. As previously explained, this occurs when the arm 41 (FIG. 2) is to the left of position P6 and the arm 51 is to the right of position P9, since under such circumstances the length of tape between the two reels is sufficiently shortened so that the take-up motor 22 is turned on to turn the reel 32 in a clockwise direction as indicated by the arrow *r* in order to supply additional tape to the reel 31, which also turns in a clockwise direction as indicated by another arrow *r*.

In practice, it is generally desirable to rewind tape in as short a time as possible. Since the rewinding of tape is a function of the rate of rotation of the supply reel 31, now acting as a take-up reel, it is apparent that the faster the reel 31 turns, the faster tape is rewound. However, from experience, it has been found that the motor 21 on which the reel 31 is mounted should not be rotated at a high speed before most of the loose tape between the two reels (31 and 32) has been taken up and the tape is gradually subjected to tensile forces. Only after the length of tape between the reels is shortened to a desired value, and the tape subjected to certain tensile strains, should the speed of rotation of the motor 21 be increased, so that tape may be rewound at a higher rate of speed. To accomplish this change in the speed of rewinding, the switches S7, S10 and S13 and the resistor R are interconnected as shown in FIG. 3. The power to the supply motor 21 may be supplied through the resistor R and the switches S7 and S13 or either one of them, as long as the arm 41 (FIG. 2) and the arm 51 are to the right of switch S7 and to the left of switch S13, respectively. The resistor R reduces the power supplied to the supply motor 21 so that its rate of rotation is of a first reduced value. However, as tape is taken up on the reel 31, the length of tape between the reels is reduced, so that the arms 41 and 51 swung further away from their relaxed positions P12 and P11, respectively. At some time during the initial rewinding operation, sufficient tape is taken up to cause the arm 51 to reach position P9 at which time switch S10 changes contact state from that shown in FIG. 3, thereby shorting out the resistor R. The reduced resistance in the power line to the supply motor 21 increases the power supplied thereto, and, therefore increases its rate of rotation. From FIGS. 2 and 3, it is apparent that the supply motor 21 in the rewind mode of operation will continue to rotate at the higher speed so long as the resistor R is shorted out by switch S10, which occurs when the arm 51 is at position P9 or to the right thereof. If, however, the motor 21 causes the reel 31 to take up tape faster than the reel 32 can supply it, the arm 41 will tend to move to the left of position P7, thereby breaking or interrupting all power to the motor 21. The particular switching circuitry 15 shown in FIG. 3 has been found to operate quite satisfactory with both magnetic and punched tape operated at speeds of 7 inches per second.

Figure 4:
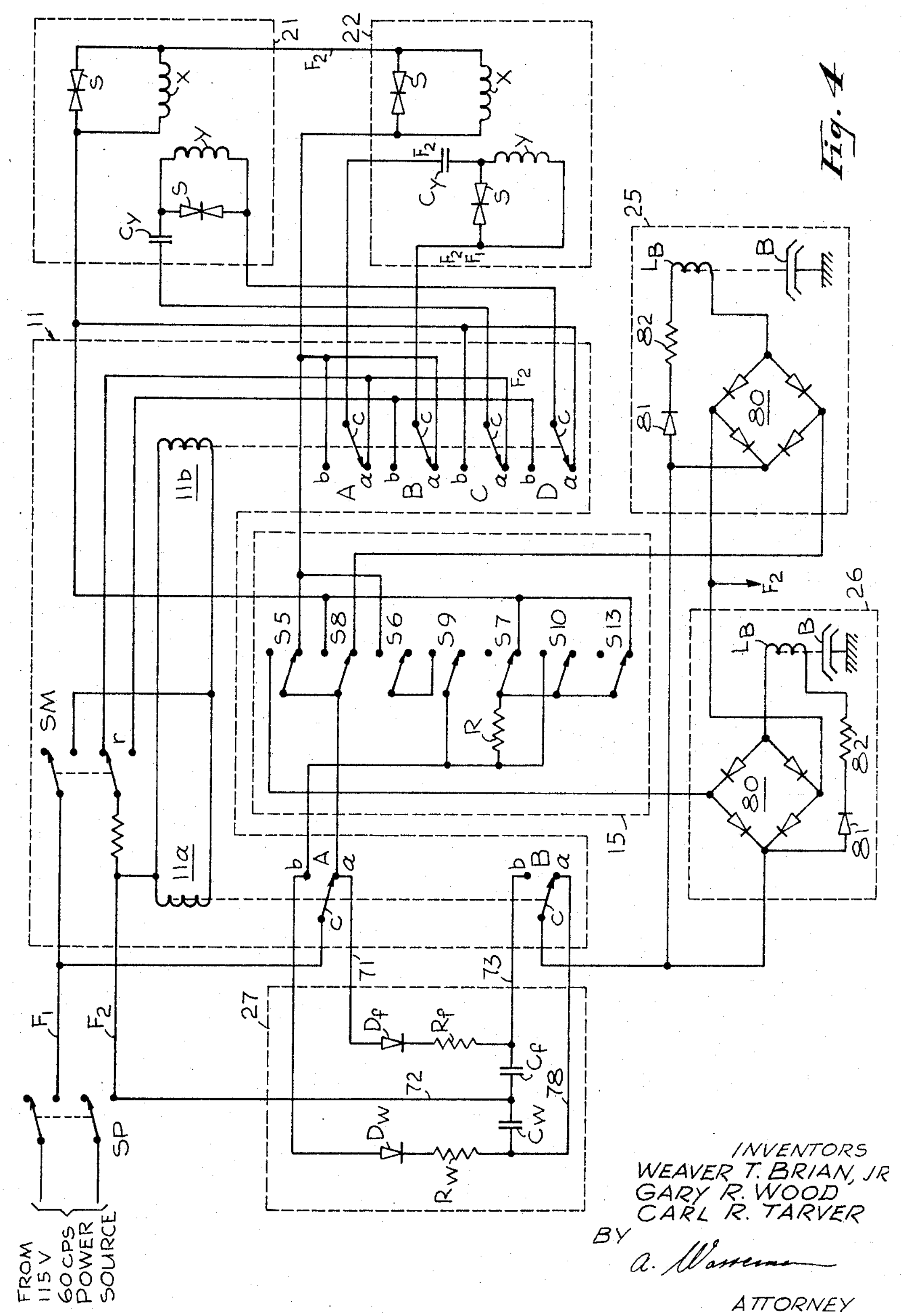
FIGURE 4 is a schematic diagram of the improved apparatus of the present invention.

Reference is now made to FIG. 4 wherein the improved tape reeler of the invention is shown in schematic form arranged for operation from a conventional power source (not shown in FIG. 4) of alternating current (A.C.) such as, for example, a source of 115 volts, 60 c.p.s. The power is supplied to the mode control circuitry 11 by means of the two A.C. power lines F1 and F2 through a power switch $S_p$. The mode control circuitry includes a mode switch $S_m$ and two relays 11*a* and 11*b*. The switch $S_m$ and the relays 11*a* and 11*b* are shown in the conditions in which they would be during the forward mode of operation, and the switch $S_p$ is shown open. Each of the drive motors 21 and 22 comprises a pair of windings *x* and *y* with a capacitor $C_y$ connected in series with the *y* winding so that each motor is a two phase motor. As motors are turned on and off, especially by means of switching contacts, electrical arcing usually results between the contacts whenever the state of energization of the motors is changed, namely, whenever power is supplied to them and especially whenever such power is abruptly interrupted. Therefore, in the improved apparatus of the invention, arc suppressing means are provided across the windings of the motors to substantially eliminate such arcing and thereby reduce the wear and damage to the contacts of the switching circuitry 15. As shown, oppositely poled voltage regulating clipper diodes S are connected across each of the windings of the motors, resulting in an increase in the life of the switches from 100,000 electrical operations to nearly one million operations.

As previously stated, one of the advantages of the improved apparatus embodying the invention is the manner in which the mode of operation of the apparatus is changed, namely, the braking or stopping of all motors and reels for a predetermined time period, after which the apparatus is caused to operate in a mode different from that in which it had been previously operated. To accomplish this end, the time dependent circuit 27 is energized during both of the modes of operation, which when changed or reversed causes the time dependent circuit 27 to energize both brake circuits 25 and 26 to stop the motors 21 and 22 for a selected time period. One example of a time dependent circuit 27 which has been successfully used in practice, and is shown in FIG. 4, comprises a rectifying diode $D_f$, a resistance R*f* and a capacitor C*f* serially connected between two lines 71 and 72. The line 72 is connected directly to the power line $F_2$ and the line 71 is connected to the power line $F_1$ through mode control circuit 11, so that the capacitor C*f* is charged up during the time the apparatus is operating in the forward mode of operation. As soon as the mode of operation is switched to rewind, the capacitor C*f* discharges through a line 73 and the mode control circuitry 11 into the brake circuits 25 and 26 which stop the motors 21 and 22 until the capacitor C*f* is discharged to a level which is insufficient to energize the brake circuits. Similarly, diode $D_w$, a capacitor $C_w$ and a resistor $R_w$ are serially connected between the line 72 and a line 77, which latter line is connected to the power line $F_1$ through the mode control circuitry 11, so that the capacitor $C_w$ is charged up during the time the apparatus is operating in the rewind mode of operation. As soon as the mode of operation is switched to forward, the capacitor $C_w$ discharges through a line 78 and the mode control circuitry 11 into the brake circuits 25 and 26 which stop the motors 21 and 22 until the capacitor $C_w$ is sufficiently discharged. Such an arrangement provides for the charging of one of the capacitors during one mode of operation, the capacitors being discharged whenever the mode of operation is reversed.

Each of the brake circuits 25 and 26 comprises a conventional full wave bridge rectifier 80, which, when energized by A.C. power, produces D.C. power which is impressed across a serially connected diode 81, a resistor 82 and a magnetic brake relay $L_B$. One corner of each bridge rectifier is connected directly to the power line $F_2$, while the opposite corner is connected to the line $F_1$ through the mode control circuitry 11 and the motor and brake switching circuitry 15. Each of the relays $L_B$ is associated with a brake assembly B which brakes or stops the motor to which it is coupled whenever the relay $L_B$ is energized. The relays may also be energized by power supplied to them from discharging capacitors such as the capacitors $C_f$ and $C_w$ of the time dependent circuit 27 previously explained.

As shown in FIG. 4, the relay 11*a* has contact assemblies A and B, each having a movable contact arm *c* and a pair of contacts *a* and *b*. The arms *c* make contact with their respective contacts *a* in the forward mode of operation, and with their respective contacts *b* when the apparatus is operated in the rewind mode of operation. The contact assembly A is used to supply current to charge up the capacitors $C_f$ and $C_w$ during the forward and rewind modes of operation, repsectively. The contact assembly A of the relay 11*a* is also used to supply power to the switching circuitry 15 during either of the two modes of operation as previously explained in connection with FIG. 3. The contact assembly B of relay 11*a* is used to provide a continuous discharge path for the charge built up on either of the capacitors $C_f$ and $C_w$ so as to energize the brake circuits 25 and 26 as previously explained.

The relay 11*b* has contact assemblies A, B, C and D, each having a movable contact *c*, making contact with its respective contacts *a* and *b* when the apparatus is operated in the forward or rewind modes of operation, respectively. The contact assemblies A and B serve to control the polarity of the power supplied to the winding *y* of the motor 22 and thereby control the direction of rotation of the motor. Similarly, contact assemblies C and D of the relay 11*b* are used to control the polarity of the power supplied to the winding *y* of the motor 21, thereby controlling its direction of rotation. The use of contact assemblies of a relay to reverse the polarity of power supplied to a motor in order to reverse its direction of rotation is well known in the art and therefore need not be further explained.

By changing the contacting state of the switch $S_m$ from that shown in FIG. 4, the relays 11*a* and 11*b* of the mode control circuitry 11 are energized so that each movable contact arm *c* breaks contact with its respective contact *a* as shown in FIG. 4 and makes contact with its respective contact *b*. The change in contacting state of the contact assemblies A–D of relay 11*b* causes the reversal in polarity of the power supplied to the *y* windings of each of the motors 21 and 22, thereby reversing their directions of rotation. The change in contacting state of the contact assembly A of the relay 11*a* enables power to be supplied to capacitor $C_w$ so as to charge it, and it also supplies power to the switches S9, S7, S10 and S13 of the switching circuitry 15, as previously explained. The change in contacting state of the contact assembly B of the relay 11*a* provides a discharge path for the charge built up on the capacitor $C_f$ during the previous forward mode of operation, so that both relays $L_B$ are energized to brake or stop the motors 21 and 22.

From the foregoing description, it is apparent that the apparatus shown in FIG. 4 includes all the advantageous features previously described in connection with FIGS. 1–3. In addition, the apparatus of the invention may include other safety features to stop the operation of the apparatus as well as any associated tape utilizing device whenever the fact that the tape has torn is detected, or whenever the tape reeler does not perform satisfactorily. This may be achieved by including contact assemblies at positions P11, P12 and P$x$ shown in FIG. 2. The contact assemblies at positions P11 and P12 will be activated to stop the apparatus whenever the arms 51 and 41 are in their respective rest positions which will occur when the tape between reel 31 and capstan 37 or the tape between capstan 37 and the reel 32 is torn. Similarly, the contact assembly at position P$x$ may cause the stopping of the apparatus whenever it is activated by the arm 51 reaching position P$x$ which indicates that the reel 31 does not supply sufficient tape in the forward mode of operation, or that in the rewind mode, it takes up tape faster than it can be supplied thereto.

Summarizing briefly, the improved tape reeler of the invention possesses novel features and advantages in that, in its forward mode of operation, it controls the supply of tape to a tape utilizing device as well as the taking up of tape therefrom, as a function of the lengths of tape between the supply and take-up means and the tape utilizing device. This substantially eliminates any undesired forces from being exerted on the tape utilizing device which usually operates at a critical predetermined speed. In the rewind mode, the improved tape reeler of the invention operates in at least two speeds. First, the apparatus is operated at a first speed so as to take up most of the loose tape between its two reels without subjecting the tape to sudden tensile forces which may rupture it. Only after most of the loose tape is taken up, as sensed by a pair of moving arms, is the speed of rewinding increased so as to rewind the tape in a short time period. The apparatus disclosed herein further provides a novel arrangement for stopping both motors for a predetermined time period whenever the mode of operation of the apparatus is changed from forward to rewind and vice versa. Such an arrangement is most significant since it freezes or stops all moving parts of the apparatus for sufficient time to permit satisfactory operation of the apparatus in a different mode from that in which it has been previously operated. The incorporation of arc suppressing means further improves the life and reliability of the apparatus.

It is apparent that the invention provides an improved tape supply and take-up reeler which may be used with various tape utilizing devices, and it is therefore intended not to be limited by the specific embodiment shown or described. Further, various changes in the selection of components and modifications in the circuitry incorporated therewith may be made by one skilled in the art without departing from the true scope and spirit of the invention.

What is claimed is:

1. An apparatus for supplying and taking up tape comprising:

first rotatable means including a first reel adapted to have a web material wound thereon for unwinding said material from said first reel as said first rotatable means are rotated;

second rotatable means including a second reel adaptted to have web material wound thereon as said second rotatable means are rotated;

switching means including a pair of biased arms adapted to operate as a function of the length of web material between said first and second reels for controlling the rotation of said first and second rotatable means;

mode control means for reversing the direction of rotation of said first and second rotatable means; and braking means including time dependent means responsive to said mode control means for stopping said first and second rotating means for a predetermined time period and then releasing them to rotate in a reversed direction.

2. An apparatus for supplying a web material moved at a predetermined rate by a capstan of a device used to transcribe data on or read data from said web material, and for taking up said web material after data has been transcribed thereon or read therefrom comprising:

a supply motor adapted to have a supply reel mounted thereon, said supply reel being rotatable by said supply motor in either of two opposite directions;

a take-up motor adapted to have a take-up reel mounted thereon, said take-up reel being rotatable by said take-up motor in either of two opposite directions;

mode control means for rotating said supply and take-up motors in a forward direction so that web material wound on said supply reel is supplied to the capstan of said device and said web material moved by said capstan is taken up by said take-up reel, said mode control means being further adapted to cause the rotation of said supply and take-up motors in a rewind direction which is opposite to said forward direction so that said web material wound on said take-up reel is unwound and supplied to the supply reel which takes up said web material supplied thereto;

switching means including biased arms about which web material is wound for controlling the rotation of said supply and take-up motors in said forward and rewind directions as a function of the forces exerted by said web material on said biased arms; and braking means inclding time dependent means for stopping said supply and take-up motor for a time period substantially controlled by said time-dependent means whenever the direction of rotation of said supply and take-up motors is reversed.

3. An apparatus for supplying tape to a tape utilizing device and for taking up tape supplied therefrom comprising:

a supply motor adapted to have a supply reel mounted thereon, said supply reel being rotatable by said supply motor in either a forward or rewind direction;

a take-up motor adapted to have a take-up reel mounted thereon, said take-up reel being rotatable by said take-up motor in either said forward or rewind direction;

mode control means for causing the rotation of said supply and take-up motors in said forward direction so that tape wound on said supply reel is supplied to said tape utilizing device and tape supplied therefrom is taken up by being wound on said take-up reel, said mode control means further being operable to cause the rotation of said supply and take-up motors in said rewind direction so that tape taken up by said take-up reel is unwound therefrom and supplied to said supply reel to be wound thereon;

switching means including a pair of biased arms about which tape is wound responsive to forces produced by the tape on said pair of biased arms for controlling the rotation of said supply and take-up motors in said forward direction and for changing the rate of rotation of said supply and take-up motors in said rewind direction;

braking means responsive to said switching means for stopping said supply and take-up motors when said motors are rotated in said forward mode for time periods controlled by said switching means; and time-dependent means coupled to said braking means to cause the stopping of said supply and take-up motors by said braking means whenever the direction of rotation of said motors is reversed.

4. The apparatus defined by claim 3 wherein said time dependent means comprises a capacitive-resistive discharging circuit its discharge time being a function of the capacitance and resistance thereof.

5. The apparatus defined by claim 3 wherein said apparatus further includes arc suppressing means coupled to said supply and take-up motors for substantially eliminating electrical arcing whenever the state of energization of said supply and take-up motors is changed.

6. An apparatus for supplying tape to a tape utilizing device and for taking up tape supplied therefrom comprising:

a supply motor having a supply reel coupled thereto said supply reel being rotatable by said supply motor in either a forward or rewind direction so that tape wound thereon is unwound therefrom and supplied to the tape utilizing device when rotated in said forward direction and tape supplied from said utilizing device taken up thereon when rotated in said reverse direction;

a take-up motor having a take-up reel coupled thereto, said take-up reel being rotatable by said take-up motor in either a forward or rewind direction so that tape supplied from said tape utilizing device is wound on said take-up reel when being rotated in said forward direction and tape supplied to said utilizing device when being rotated in said reverse direction;

means including braking means, a plurality of switches and a pair of arms about which tape between said supply and take-up reels is wound for controlling the rotation of said supply and take-up motors in said forward and rewind directions as functions of the length of tape between said supply motor and said tape utilizing device and the length of tape between said take-up motor and said tape utilizing device respectively, said switching means further controlling the rotation of said supply motor in the rewind direction so as to increase the speed of rotation thereof by a predetermined value whenever preselected switches of said plurality of switches are actuated by said pair of arms as a function of the length of tape being rewound on said supply reel;

mode control means for causing the rotation of said supply and take-up motors in said forward direction so that tape wound on said supply reel is supplied to said tape utilizing device and tape supplied therefrom is taken up by being wound on said take-up reel, said mode control means further being operable to cause the rotation of said supply and take-up motors in said rewind direction so that tape taken up by said take-up reel in unwound therefrom and supplied to said supply reel to be wound thereon;

time-dependent means energizing said braking means to cause said supply and take-up motors to be stopped by said braking means for a preselected time period, whenever the direction of rotation of said motors is reversed by said mode control means.

7. The apparatus defined by claim 6 wherein said time dependent means comprises a capacitive-resistive discharging circuit, its discharge time being a function of the capacitance and resistance thereof.

8. The apparatus defined by claim 6 wherein said apparatus further includes arc suppressing means coupled to said supply and take-up motors for substantially eliminating electrical arcing which may occur across contacts of said plurality of switches whenever the state of energization of said supply and take-up motors is changed.

9. In an improved tape reeler having supply and take-up reels adapted to supply tape to, and take up tape from, a tape utilizing device by being rotated in either a forward or rewind direction when said tape reeler is operated in a forward or rewind mode of operation respectively, the improvement comprising:

first means energizable when said tape reeler is operable in said rewind mode of operation to sense the length of tape between said supply and take-up reels, and second means responsive to said first means for controlling the speed of rotation of said supply reel in a rewind direction as a function of the length of tape between said supply and take-up reels when said tape reeler is operable in said rewind mode of operation.

10. The apparatus defined by claim 9 wherein said supply reel is rotated in said rewind direction at a first speed when the length of tape between said supply and take-up reels exceeds a predetermined length, said supply reel being rotated at at least one other speed which is greater than said first speed whenever the length of tape between said supply and take-up reels is below said predetermined length.

11. In a tape reeler having supply and take-up motors, adapted to supply tape to, and take up tape from, a tape utilizing device when operated in either a forward or rewind mode of operation, said tape reeler further including time dependent circuitry and braking circuitry responsive to said time dependent circuitry for stopping the supply and take-up motors for a predetermined time period whenever the mode of operation of said tape reeler is reversed, the improvement comprising:

electrical arc suppressing means for substantially eliminating electrical arcing which may be caused whenever the state of energization of said supply and take-up motors is changed.

12. In an improved tape reeler having supply and take-up motors, adapted to supply tape to, and take up tape from, a tape utilizing device when operated in either a forward or rewind mode of operation the improvement comprising:

time dependent circuitry for stopping the supply and take-up of tape for a predetermined time period whenever the mode of operation of said tape reeler is reversed, said time dependent circuitry comprises a first capacitive-resistive network which is charged when said tape reeler is operating in said forward mode of operation, said first network being discharged to stop the supply of and take up of tape for a predetermined time period when said tape reeler is caused to operate in said rewind mode of operation; and a second capacitive-resistive network which is charged when said tape reeler is operating in said rewind mode of operation, said second network being discharged to stop the supply and take up of tape for said predetermined time period when said tape reeler is caused to operate in said forward mode of operation.

13. The apparatus defined by claim 12 further including:

magnetic braking circuitry responsive to said time-dependent circuitry for stopping said supply and take-up motors for said predetermined time period.

14. The apparatus defined by claim 13 further including:

electrical arc suppressing means for substantially eliminating electrical arcing which may be caused whenever the state of energization of said supply and take-up motors is changed.

References Cited by the Examiner

UNITED STATES PATENTS

| | | | |
|---|---|---|---|
| 2,574,218 | 11/1951 | Lynch | 242—55.12 |
| 2,985,396 | 5/1961 | Johnson | 242—55.12 |
| 3,105,179 | 9/1963 | Young et al. | 318—6 |
| 3,137,453 | 6/1964 | Woolridge | 242—55.12 |

FRANK J. COHEN, *Primary Examiner.*

LEONARD D. CHRISTIAN, *Examiner.*